US008345988B2

(12) United States Patent
Shan et al.

(10) Patent No.: US 8,345,988 B2
(45) Date of Patent: Jan. 1, 2013

(54) METHOD AND APPARATUS FOR RECOGNIZING 3-D OBJECTS

(75) Inventors: Ying Shan, West Windsor, NJ (US);
Bogdan Calin Mihai Matei, Monmouth Junction, NJ (US); Harpreet Singh Sawhney, West Windsor, NJ (US);
Rakesh Kumar, Monmouth Junction, NJ (US)

(73) Assignee: SRI International, Menlo Park, CA (US)

( * ) Notice: Subject to any disclaimer, the term of this patent is extended or adjusted under 35 U.S.C. 154(b) by 1140 days.

(21) Appl. No.: 11/159,969

(22) Filed: Jun. 22, 2005

(65) Prior Publication Data

US 2006/0013450 A1    Jan. 19, 2006

Related U.S. Application Data

(60) Provisional application No. 60/581,793, filed on Jun. 22, 2004.

(51) Int. Cl.
*G06K 9/68* (2006.01)
(52) U.S. Cl. .......................................... 382/218; 707/747
(58) Field of Classification Search .................. 382/216, 382/258, 181, 276, 282, 160, 190, 218; 706/19; 700/33, 34, 36, 100, 103; 375/E7.116, E7.273; 345/631; 707/747
See application file for complete search history.

(56) References Cited

U.S. PATENT DOCUMENTS

| | | | |
|---|---|---|---|
| 5,351,310 A * | 9/1994 | Califano et al. | 382/199 |
| 5,888,738 A * | 3/1999 | Hendry | 435/6 |
| 5,963,653 A | 10/1999 | McNary et al. | |
| 6,016,487 A * | 1/2000 | Rioux et al. | 707/743 |
| 6,026,189 A * | 2/2000 | Greenspan | 382/226 |
| 6,278,798 B1 * | 8/2001 | Rao | 382/154 |
| 6,597,818 B2 * | 7/2003 | Kumar et al. | 382/294 |
| 6,745,205 B2 | 6/2004 | Choi et al. | |
| 6,847,728 B2 * | 1/2005 | Tao et al. | 382/106 |
| 6,959,112 B1 | 10/2005 | Wagman | |
| 7,085,409 B2 * | 8/2006 | Sawhney et al. | 382/154 |
| 7,200,270 B2 * | 4/2007 | Yamaguchi | 382/224 |
| 7,362,920 B2 * | 4/2008 | Xu et al. | 382/294 |
| 2003/0018457 A1 * | 1/2003 | Lett et al. | 703/11 |
| 2003/0030638 A1 * | 2/2003 | Astrom et al. | 345/420 |
| 2003/0033127 A1 * | 2/2003 | Lett | 703/11 |

OTHER PUBLICATIONS

Slater et al., Combining Color and Geometric Information for the Illumination Invariant Recognition of 3-D Objects, Jun. 20-23, 1995, Proceedings, Fifth International Conference on Computer Vision, 1995, pp. 563-568.*
Al-Mouhamed, A Robust Gross-to-Fine Pattern Recogntion System, Dec. 2001, IEEE Transactions on Industrial Electronics, vol. 48, No. 6, pp. 1226-1237.*
Johnson et al., Using Spin Images for Efficient Object Recognition in Cluttered 3D Scences, May 1999, IEEE Transactions on Pattern Analysis and Machine Intelligence, vol. 21, No. 5, pp. 433-449.*
Shakhnarovich et al., Fast Pose Estimation with Parameter-Sensitive Hashing, Ninth IEEE International Conference on Computer Vision, 2003 [on-line], Oct. 13-16, 2003, vol. 2, pp. 750-757. Retrieved from http://ieeexplore.ieee.org/xpls/abs_all.jsp?arnumber=1238424.*

* cited by examiner

*Primary Examiner* — Vikkram Bali
*Assistant Examiner* — Dennis Rosario
(74) *Attorney, Agent, or Firm* — Moser Taboada

(57) ABSTRACT

A method and apparatus for recognizing an object, comprising providing a set of scene features from a scene, pruning a set of model features, generating a set of hypotheses associated with the pruned set of model features for the set of scene features, pruning the set of hypotheses, and verifying the set of pruned hypotheses is provided.

16 Claims, 2 Drawing Sheets

METHOD AND APPARATUS FOR RECOGNIZING 3-D OBJECTS

CROSS-REFERENCE TO RELATED APPLICATIONS

This application claims benefit of U.S. provisional patent application Ser. No. 60/581,793, filed Jun. 22, 2004, the entire disclosure of which is herein incorporated by reference.

GOVERNMENT RIGHTS IN THIS INVENTION

The present invention was made with U.S. government support under contract number F33615-02-C-1264 (DARPA). The U.S. government has certain rights in the present invention.

BACKGROUND OF THE INVENTION

1. Field of the Invention

Embodiments of the present invention generally relate to 3-D object recognition and, in particular, to a method and apparatus for 3-D object recognition using indexing and verification methods.

2. Description of the Related Art

Object recognition, such as 3-D object recognition, involves the solution of several complicated problems. For example, there is (1) the unknown pose between the scene feature (e.g., several related points of a scene object in 3-D space) and the model, (2) the scene feature-model discrepancy due to occlusions and clutter in a given scene, and (3) the computational cost of comparing each individual model from a model database to match against the inputted scene feature. Alignment-based verification techniques have been used to address the first two problems. However, existing alignment-based techniques apply sequential RANSAC-based techniques to each individual model from the database and hence, do not address the computational issues related to the third problem when mapping to a large model database.

Stated another way, where there is a large model database and an inputted scene feature having several points, a determination must be made as to which model corresponds to this scene feature or set of scene features. Because of the limitation of sensors, the scene feature can be noisy and particularly occluded as compared with the model database. Therefore, indexing of the scene feature obtained from the scene for 3-D recognition and matching the model must be performed very quickly. For example, there may be between about 100 to 200 models in a given database. Each model has several hundred model features associated therewith. Traditionally, there has to be a comparison of the scene features with the model features in the model database sequentially (e.g., one-by-one). This is very time consuming, computationally extensive and costly.

Geometric hashing and its variants perform object recognition using high dimensional representations that combine (quasi-)invariant coordinate representations with geometric coordinate hashing to prune a model database while employing geometric constraints. However, the time and space complexity of creating geometric cache tables is polynomial in the number of feature points associated with each model. Furthermore, because the (quasi-)invariant coordinate representations are relatively low-dimensional (e.g., typically two or three), the hash table can become crowded even with small model databases and the runtime complexity can deteriorate to a linear complexity that again does not scale with the size of the database.

Thus, there is a need in the art for a joint feature-based model indexing and geometric constraint based alignment pipeline for efficient and accurate recognition of objects and especially 3-D objects. Furthermore, there is a need for recognition techniques used in recognizing 3-D objects from a large model database of 3-D range images.

SUMMARY OF THE INVENTION

Embodiments of the present invention are directed to generating pose hypotheses for transforming scene features with high probability of being a match against one or more model features and scoring those model features with robust match or verification measures. In one embodiment, by employing approximate high dimensional nearest-neighbor search techniques, embodiments of the present invention avoid or at least substantially minimize the problem of premature model pruning while maintaining the accuracy of alignment-based verification methods.

In accordance with one embodiment of the present invention, there is provided a method for recognizing an object, comprising providing a set of scene features from a scene, pruning a set of model features, generating a set of hypotheses associated with said pruned set of model features for said set of scene features, pruning said set of hypotheses, and verifying said set of pruned hypotheses.

BRIEF DESCRIPTION OF THE DRAWINGS

So the manner in which the above recited features of the present invention can be understood in detail, a more particular description of the present invention, briefly summarized above, may be had by reference to embodiments, some of which are illustrated in the appended drawings. It is to be noted; however, the appended drawings illustrate only typical embodiments of this present invention and are therefore not to be considered limiting of its scope, for the present invention may admit to other equally effective embodiments.

DETAILED DESCRIPTION

Figure 1:
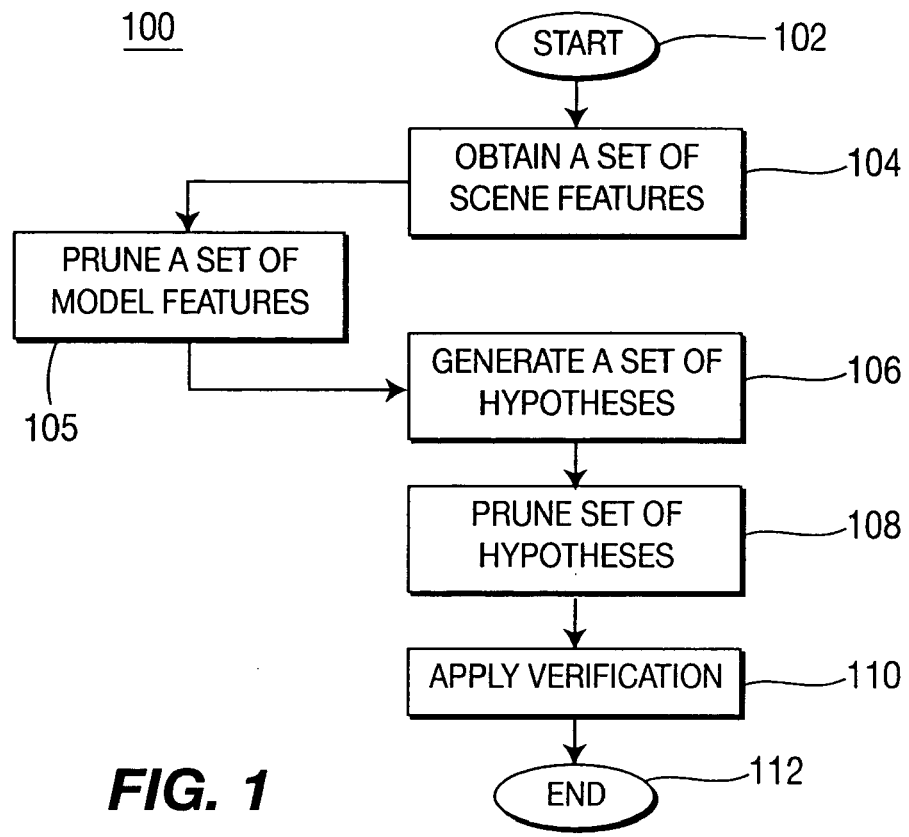
FIG. 1 is a flow diagram of a method in accordance with an embodiment of the present invention.

In accordance with embodiments of the present invention, there is provided certain methods that relate to appearance feature and alignment-based approaches to object recognition. In certain embodiments, for example, regarding 3-D models and range images, and 3-D point clouds, "appearance" and features are computed not based on intensities or color but on semi-local 3-D configuration of points in the scenes and models. Under a feature-based framework, both the model and the scene objects are represented as a collection of shape features, or signatures, or scene features. By way of example, but in no way limiting the scope of the present invention, one example of scene features are 3-D shape descriptor images. Furthermore, one example of scene features may comprise spin images.

The scene features represent appearance as a high-dimensional feature and have an associated local coordinate system, a 3-D location on the object and a local normal. Therefore, each feature encapsulates the local distribution of 3-D points within its scope and also is in a coordinate geometric relation with other features on the scene object. Recognition methods typically vary according to their treatments of the scene feature attributes in the feature configurations.

Embodiments of the present invention are improvements over variants of geometric hashing that employ higher dimensional feature. Random Sample Consensus (RANSAC) is an effective data-driven alignment and verification technique. Instead of generating pose hypotheses exhaustively, RANSAC generates only a limited number of hypotheses with a sampling process guided by the matching of scene and model feature attributes.

Generation of potentially good quality pose hypotheses can be aided by the use of high-dimensional appearance features by employing approximate "nearest neighbor" search methods. One example of a nearest neighbor search method is called Locality-Sensitive Hashing (LSH). LSH is a form of indexing or a probabilistic method for approximating nearest neighbor search and achieving sub linear complexity in the number of features in a database. Embodiments of the present invention include methods that use both high-dimensional feature attributes and global geometric configurations for recognition.

For purposes of the present invention, the following notations should be considered:

For the scene object, a set of scene features $\{b_1, b_2, \ldots, b_s\}$ and a set of normals to the surface $\{q_1, q_2, \ldots, q_s\}$ are computed at basis points $\{p_1, p_2, \ldots, p_s\}$ uniformly sampled along the surface of the object, where $b_k \in R^d$, $p_k, q_k \in R^3$, d is the number of bins in each scene feature or spin image, and s is the number of scene features or spin images in the scene object. Let $\alpha^k = (b_k, p_k, q_k)$, k=1, . . . , s, representing an augmented spin image that includes its local coordinate system, and q be the set of all augmented spin images.

Similarly, let $\beta^k_i = (b^k_i, p^k_i, q^k_i, i)$, k=1, . . . , $t_i$ be an entry in the ith model database, where $t_i$ is the number of scene features or spin images in the ith model. In one embodiment, the parameter i can be implemented as a model ID, e.g., a model identifier. Embodiments of the present invention will generally refer to α and β as scene features and model features, respectively, in the following discussion.

In addition, $b_k$ is equal to a 3-D surface descriptor; $p_k$ is equal to the basis point (location); and $q_k$ is equal to the normal direction of the plane at the location $p_k$. $\alpha^k$ equals a scene feature. $\beta^k_i$ equals a model feature. And i equals a model ID or identity in the feature (e.g., hash model ID in to the feature).

As mentioned previously, solving the likelihood among pose hypotheses in a models database with pose hypotheses generated to transform all possible pairs of scene features to model features is prohibitively expensive. On the other hand, it is also important to insure the accuracy if only a small portion of these hypotheses are used.

Embodiments of the present invention use three steps, e.g., scene feature (e.g., spin image-based) pruning, doublet-based pruning, and RANSAC-based verification, to mitigate these problems. Spin image-based feature pruning or scene feature pruning uses one scene feature at a time to prune the model features whose scene features are not similar in the parameter space. With the assistance of LSH, this step is processed very efficiently without sequentially accessing all of the model features in the models database.

Doublet-based pruning (discussed further herein below) uses a pair of scene features at a time to prune the model-pose hypotheses that are inconsistent with the double constraint. The doublet constraint is a powerful constraint that, in one embodiment, uses both distance and surface normal to check the consistency between the scene feature pair and the model feature pair. After the first two steps, the remaining pose hypotheses are verified by warping or transforming all the features of the hypothesized model to the scene features with the hypothesized poses. After warping or transforming the likelihood of the hypothesized model being matched with the scene feature, a score is computed based on the consensus features. The maximum likelihood is recorded for the each hypothesized model, and the model with the highest maximum likelihood is selected as the match out of all the pose hypothesized models.

Turning now to FIG. 1, there is provided a flow diagram depicting a method 100 in accordance with an embodiment of the present invention. The method 100 is for recognizing, in one embodiment, a 3-D object and begins at step 102. The present invention contemplates other object recognition methods and techniques not limited to 3-D object recognition. For purposes of clarity, embodiments of the present invention are described with respect to 3-D object recognition.

The method proceeds to step 104 where a set of scene features is provided for inputting into the models database for comparison with stored model features. For example, the set of scene features is obtained from an input or query scene, e.g., of a vehicle with a particular pose. At step 105, a set of model features are first pruned out of the models database using, for example, the LSH technique described herein. At step 106, a set of pose hypotheses are generated based on the likely matching of the scene features inputted from the query or input scene object with model features. This scene object may be slightly occluded in an embodiment and the method can still be capable of substantially recognizing the inputted scene object. At step 108, the set of pose hypotheses are pruned. At step 110, a verification method is applied to the pruned set of pose hypotheses. At step 112, the method ends.

Regarding step 106, e.g., the generation of a set of hypotheses, this step may comprise transforming at least one scene feature into at least one model feature. It also may comprise transforming a plurality of scene features into a plurality of model features. The step 108 of pruning the set of pose hypotheses may comprise at least two sub steps of pruning. For example, the step of pruning the set of hypotheses of model features may first include applying surface descriptor parameters to remove bogus model features and thus limit the amount of model features available for the next step. This may be on the order of about 10,000 to 20,000 model features. The numerical data discussed above is only for illustrative purposes and is not intended to limit the scope of the present invention in any way.

In the next sub step of pruning under step 108, in one embodiment of the present invention, there may be an application of a doublet-based hypothesis generation and pruning to remove bogus model features. The applying of doublet-based pruning may comprise obtaining a matched pair of scene features with a pair of model features. From this set of matched pairs, at least one pose hypothesis may be generated.

The step of obtaining a pair of scene features and corresponding pair of model features may comprise, in one embodiment, associating angle to a normal and distance between each feature in each set of pairs to determine whether or not a match has occurred. If the compared set of scene features and model features have substantially the same distance between the two objects in each pair and the same or substantially the same angle from normal between the objects in each pair, for example, then there is a likely match and the pose hypotheses of that model is kept. For all other pairs, where the distance and angle do not match or are not substantially the same, those pose hypotheses are pruned away.

Returning now to the surface descriptor-based feature pruning with LSH, the following is the description of one form of pruning with LSH. Given a single high-dimensional space is extremely time consuming. LSH is a probabilistic solution for the approximate nearest neighbor problem.

The unique property of LSH is that it relates the probability of collision to the $L_1$ distance between two vectors. In other words, in one embodiment, if two vectors are close in distance, they will have high probability of landing in the same bucket of the hash table. The problem of finding the nearest neighbors then turns to then searching only the vectors in the bucket that have the same hash code as the scene feature vector.

The probability of collision as the function of the $L_1$ distance has the following form: $P_c=1-(1-(1-d/d_c)^K)^L$, where $d_c$ is a constant related to the maximum distance between any two vectors in the set under the consideration, d is the actual distance between two vectors, K is the number of bits used to sample the vectors in the Hamming space, and L is the number of hash tables.

Returning now to the doublet-based hypothesis generation and pruning step, there is provided an embodiment of the present invention as follows. From a pair of scene features $(\alpha^{l_1}, \alpha^{l_2})$ and a corresponding pair of model features $(\beta^{k_1}_j, \beta^{k_2}_j)$, one can generate a pose hypotheses $\Phi_i$ for the ith model. A good hypothesis should be geometrically consistent, that is, if one warps $(\beta^{k_1}_j, \beta^{k_2}_j)$ to $(\alpha^{l_1}, \alpha^{l_2})$ according to the hypothesized pose, both the locations and the normal directions should be substantially similar between the corresponding features.

Because an actual pose computation may involve SVD decomposition of a 3×3 matrix and some other expensive operations, one would use a cascaded filter using the four doublet geometric constraints. Given a pair of correspondences, one can apply these four constraints sequentially and compute the real pose only if it passes all of them. In this way, one can throw away bogus hypotheses early on without spending time computing an actual pose. In order to compute stable pose from corresponding scene-model pairs that pass the consistency check, one would also require that $\|p^{l_1}-p^{l_2}\| \geq d_{min}$, and $\arccos(q^{l_1} \cdot q^{l_2}) \geq \theta_{min}$.

Regarding step 110 relating to the verification method application, this is referred to herein as a likelihood computation. That is, once a pose hypotheses $\theta_i$ is generated for a hypothesized model i, one can warp or transform all the features of the model into the scene coordinate system. For each scene feature $\alpha^l$, one can then search for a warped model feature $B^1_i$ that maximizes the likelihood. The following formulae will be discussed immediately following.

Once a pose hypothesis $\Phi_i$ generated for the hypothesized model i, in one embodiment, the system can warp all the features of the model into the query coordinate system. For each query feature $\alpha^l$, the method then searches for a warped model feature $B^{k_1}_i$ that maximizes the likelihood $$p(\alpha^l,\beta^k_i|\Phi_i) = p_o(\alpha^l,\beta^k_i|\Phi_i) \, p_n(\alpha^l,\beta^k_i|\Phi_i) \, p_s(\alpha^l,\beta^k_i), \quad (1)$$

where $p_s(\alpha^l,\beta^k_i)$ measures the similarity between the spin images $b^l$ and $b^k_i$, $p_o(\alpha^l,\beta^k_i|\Phi_i)$ is the probability of matching the origins given the pose $$p_o \propto \begin{cases} \exp\left[-\frac{(p^l - p^k_i)^2}{2\sigma^2}\right], & \text{if } \|p^l - p^k_i\| \leq \Delta \\ \exp\left(-\frac{\Delta^2}{2\sigma^2}\right), & \text{if } \Delta \langle \|p^l - p^k_i\| \leq \Delta_{max}, \\ 0, & \text{otherwise} \end{cases} \quad (2)$$

and $p_n(\alpha^l,\beta^k_i|\Phi_i)$ is the probability of matching the normals given the pose $$p_n = \begin{cases} 1, & \text{if } a\cos(q^{kT}_i \cdot q^l) \leq \eta_{max} \\ 0, & \text{otherwise} \end{cases} \quad (3)$$

In formula (2), $\Delta$ is a threshold suitably chosen to separate inliers from outliers, $\Delta_{max}$ is the maximum spread of the outliers. We have assumed that the distribution of the inliers is Gaussian, and having noise standard deviation $\sigma$. In formula (3), $\eta_{max}$ is the maximum angle error.

The likelihood of the pose given the query can then be computed assuming that the query features are independent $$p(Q|\Phi_i) = \prod_{l=1}^{s} p(\alpha^l, \beta^{k_l}_i | \Phi_i). \quad (4)$$

Note in formula (4) that $\beta^{k_l}_i$ is the warped model feature that maximizes the likelihood in formula (1). The query feature $\alpha^l$ is inlier if $p(\alpha^l,\beta^{k_l}_i|\Phi_i)$ is large.

The likelihood calculation of the aforementioned formulae (e.g., formulae (1) to (4)) associates a measure of how well a pose hypothesis belonging to model k (recall generated by a doublet that passes certain constraints) will fit a model. For each query, one has calculated surface descriptors ($\alpha$), which consist of the location and normal of the surface where the surface descriptor was estimated together with the signature (e.g., spin image), which quantifies the local surface information in the neighborhood of the surface feature $\alpha$.

Given the features $\beta$ similarly pre-computed for the model k, one needs to associate each $\alpha_i$ feature in the scene feature to one of the $\beta$ features from the model k. That is, the feature $\beta_j$, which has the best match to $\alpha_i$. (See formula (1).) Formula (1) states that one assigns a scene feature to the model feature (of course after the model feature has been warped towards the scene), which yields the best match (e.g., the highest probability of correspondence).

Formulas (2) and (3) provide a means of computing the individual probability of correspondence. One also takes into account outliers in order to have a robust matching score. That is the role of thresholds $\Delta_{max}$ in formula (2) and $\eta_{max}$ at formula (3). If the error is larger than these thresholds, the user limits the error associated to that match such that a single bogus correspondence will not overwhelm the final score. Formula (4) expresses that each individual probability of matching is combined in a final score by assuming that each match is independent.

Figure 2:
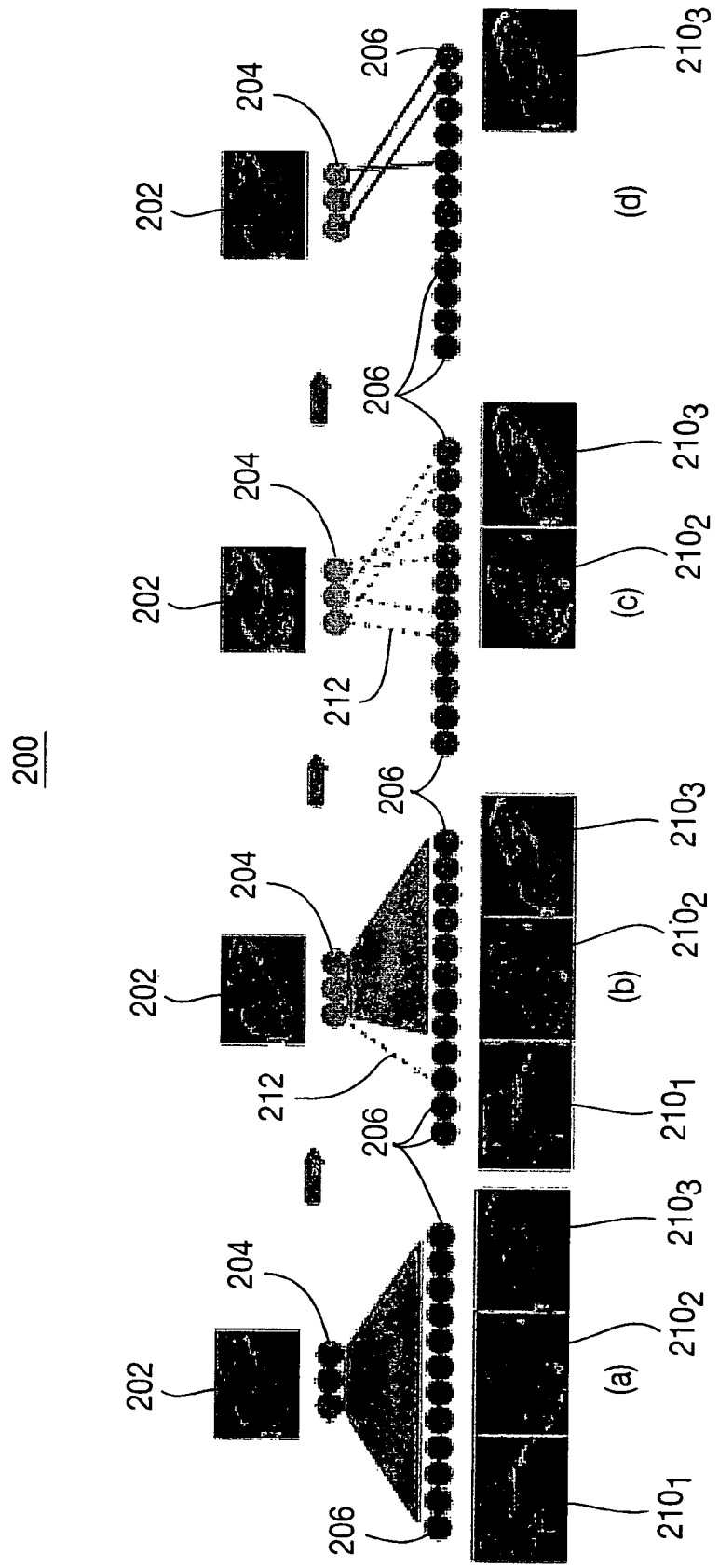
FIG. 2 is an illustration of the method of FIG. 1.

Turning now to FIG. 2, which is an illustration of the method 200 described herein above. The cones and dashed lines represent possible matches. Solid lines represent solved matches. In FIG. 2, section (a), a scene object or input scene 202 is provided. Initially, any one of the scene features 204 can be matched with any one of the model features 206 as represented by a cone 208. Here, at least three models 210₁, 210₂ and 210₃ have been selected. In FIG. 2, section (b), after scene feature-based pruning, there are fewer possible matches 212 remaining for the left most vehicle 210₁ because other the vehicles' model features 210₂, ₃ are more similar to the set of scene feature 204. As a result, only a few pose hypotheses will be generated for this model. This stage involves only one scene feature at a time.

In FIG. 2, section (c), after doublet-based pruning, possible matches 212 between the scene features 204 and the possible models 210 are dramatically reduced. The left most vehicle 210$_1$ does not have any possible matches and is no longer considered for matching beyond this point. This stage involves a pair of scene features at a time.

In FIG. 2, section (d), after RANSAC based verification, the right model 210$_3$ is picked as the match because it has the most consensus points and inliers. This stage involves all or a percentage of all scene features 204 at a time.

Given a set of scene features 204, for example, the model database, and an LSH table generated from the model database, the batch RANSAC recognition method is herein described. This includes an initialization step, which is setting all likelihood to zero. To begin the batch RANSAC method, there is provided scene features 204 that are derived from a scene object 202, which equals a number of 3-D points or samples from actual 3-D surfaces. A scene feature 204 can also equal a spin image.

The next step is to go to several locations on the surface of the 3-D points and compute the 3-D surface descriptors. The model features 206 are generated and put into a database a priori. Then, there is generated an LSH table or indexing from the models database, which is used to accelerate the indexing/searching process. Given the scene features 204, the question becomes what are the similar model features 206 in the model database?

After the initialization stage, the next step is the scene feature-based pruning stage for each scene feature 204. This step provides the most image based features in the models database. For example, at this time, there are about a 100 scene features 204 per query. For each scene feature, there are about 10 to 20 candidate model features 206 for a possibility of 1,000 to 2,000 possible matches. The model features not similar to the query will be pruned away. At this time, there will be about 10,000 to 100,000 pose hypotheses of model features possible for the correct transformation from scene features to model features.

The next step is the doublet-based pruning step, which occurs where a pair of scene features 204 (FIG. 2, section (c)) are matched with a pair of model features 206. The distance and angles are tested. This narrows down the amount of surviving pose hypotheses to between about 100 and 1,000. For each 100 to 1,000 pose hypotheses, they are warped or transformed. Once transformed, similarity metrics for the two vehicles are computed. After computing the likelihood or similarity metrics, the final step is to pick the pose hypothesis that generates the maximum likelihood. In this regard, the highest score is taken. This output is then used to recognize the object under test. The numerical data discussed above is only exemplary to illustrate the present invention and is not intended to limit the scope of the present invention in any way.

Alternatively, in addition to using pose transformation information, the pose hypothesis can also be based on a model ID itself. Each model feature is in the database, including a hash model ID, for example.

Figure 3:
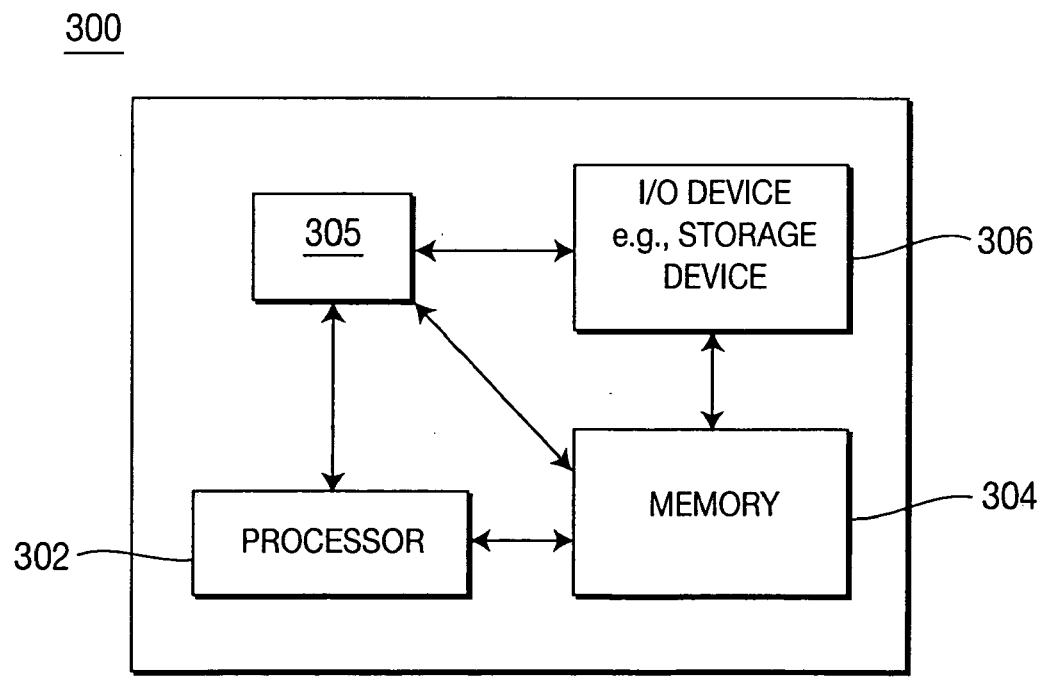
FIG. 3 is a block diagram of an image processing apparatus for implementing the above-mentioned methods in accordance with a further embodiment of the present invention.

FIG. 3, illustrates a block diagram of a 3-D object recognition device or system 300 of the present invention. In one embodiment, the 3-D object recognition device or system 300 is implemented using a general purpose computer or any other hardware equivalents. All or various components of system 300 can be adapted to a digital video camera or digital still camera.

Thus, 3-D object recognition device or system 300 comprises a processor (CPU) 302, a memory 304, e.g., random access memory (RAM) and/or read only memory (ROM), a 3-D object recognition module 305, and various input/output devices 306, (e.g., storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands).

It should be understood that the 3-D object recognition engine 305 can be implemented as physical devices that are coupled to the CPU 302 through a communication channel. Alternatively, the 3-D object recognition engine 305 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 304 of the computer. As such, the 3-D object recognition engine 305 (including associated data structures) of the present invention can be stored on a computer readable medium, e.g., RAM memory, magnetic or optical drive or diskette, and the like.

The processor 302 of the 3-D object recognition device 300 may comprise an image processor. The image processor may receive input from a scene features outside source. The image processor generally comprises circuitry for capturing, digitizing and processing scene features from the outside source. The image processor may be a single-chip video processor and the like.

The processed scene features are communicated to the processor 302. The processor 302 may comprise any one of a number presently available high speed micro controllers or micro processors. The processor 302 supported by support circuits 306. The memory 304 also communicates with the processor 302. The memory 304 stores certain software routines executed by the processor 302 and by the image processor to facilitate the operation of embodiments of the present invention, e.g., the various methods as discussed above.

The memory 304 also stores data in a database of information used by the embodiments of the present invention, and image processing software used to process the scene features. Although embodiments of the present invention are described in the context of a series of method steps, the methods may be performed in hardware, software, firmware, or some combination of hardware and software. In a relation to the methods described above, regarding the recognition of 3-D objects, the device 300 may include in the database the models database and the LSH table and indexing. The image processor also includes the RANSAC method and all pruning methods in the image processing software.

The invention claimed is:

1. A method for recognizing an object in a scene coordinate system with a set of model features from a plurality of sets of model features, comprising:
    obtaining a set of scene features associated with the object from the scene coordinate system;
    pruning the set of model features from a database, based on a comparison between the set of scene features and the set of model features to produce a pruned set of model features by applying a set of normals representing surface descriptor parameters to prune bogus model features, wherein the surface descriptor parameters comprise a location and a spin image;
    generating a set of pose hypotheses based on a pair of scene features selected from the set of scene features;
    removing one or more bogus pose hypotheses from the set of pose hypotheses through the use of geometric constraints, thereby creating a refined set of pose hypotheses;

pruning said refined set of pose hypotheses based on a comparison between each pose hypotheses from the refined set of pose hypotheses and a pair of model features selected from the set of pruned model features by:
computing the probability of collision between generated hash values of each of the refined set of pose hypotheses and the pair of model features and retaining those pose hypotheses from the refined set of pose hypotheses and the pair of model features whose probability of collision is above a threshold probability; and
selecting a verified pose hypothesis from the pruned and refined set of pose hypotheses by:
transforming the pruned set of model features into the scene coordinate system, calculating a similarity score for each pose hypothesis from the pruned and refined set of pose hypotheses based on a similarity between the each pose hypothesis and the transformed set of model features, and identifying the verified pose hypothesis associated with a highest similarity score.

2. The method of claim 1, wherein at least one of said refined set of pose hypotheses is used to transform said set of scene features into said pruned model features.

3. The method of claim 1, wherein pruning the set of model features comprises applying locality sensitive hashing (LSH) to prune said bogus model features.

4. The method of claim 1, further comprising a step of applying doublet-based hypotheses parameters comprising:
obtaining a pair of scene features for transforming to a corresponding pair of model features; and
generating a pose hypothesis.

5. The method of claim 4, wherein said step of applying doublet-based hypotheses parameters comprises associating angle and distance between the pair of scene features and the pair of model features.

6. The method of claim 1, wherein said step of generating the set of pose hypothesis comprises applying a RANSAC-based verification method.

7. The method of claim 6, wherein said RANSAC-based verification method is a multi-model RANSAC-based verification method.

8. The method of claim 1, wherein the set of scene features are obtained from a three dimensional point cloud.

9. A non-transitory computer-readable medium having stored thereon a plurality of instructions, which, when executed by a processor, cause the processor to perform the steps of a method for recognizing an object in a scene coordinate system with a set of model features from a plurality of sets of model features stored in a database, comprising:
obtaining a set of scene features associated with the object from the scene coordinate system;
pruning the set of model features from the database, based on a comparison between the set scene features and the set model features to produce a pruned set of model features by applying a set of normals representing surface descriptor parameters to prune bogus model features, wherein the surface descriptor parameters comprise a location and a spin image;
generating a set of pose hypotheses based on a pair of scene features selected from the set of scene features;
removing one or more bogus pose hypotheses from the set of pose hypotheses through the use of geometric' constraints, thereby creating a refined set of pose hypotheses;
pruning said refined set of pose hypotheses based on a comparison between each pose hypotheses from the refined set of pose hypotheses and a pair of model features selected from the set of pruned model features by:
computing the probability of collision between generated hash values of the refined set of pose hypotheses and the pair of model features and retaining those pose hypotheses from the refined set of pose hypotheses and the pair of model features whose probability of collision is above a threshold probability; and
selecting a verified pose hypothesis from the pruned and refined set of pose hypotheses by:
transforming the pruned set of model features into the scene coordinate system, calculating a similarity score for each pose hypothesis from the pruned and refined set of pose hypotheses based on a similarity between the each pose hypothesis and the transformed set of model features, and identifying the verified pose hypothesis associated with a highest similarity score.

10. The computer-readable medium of claim 9, wherein at least one of said refined set of pose hypotheses is used to transform said scene features into said pruned model features.

11. The computer-readable medium of claim 9, pruning the set of model features comprises applying locality sensitive hashing (LSH) to prune said bogus model features.

12. The computer-readable medium of claim 9, further comprising a step of applying doublet-based hypotheses parameters comprising:
obtaining a pair of scene features for transforming to a corresponding pair of model features; and
generating a pose hypothesis.

13. The computer-based medium of claim 12, wherein said step of applying doublet-based hypotheses parameters comprises associating angle and distance between the pair of scene features and the pair of model features.

14. The computer readable method of claim 9, wherein said step of generating the set of pose hypothesis comprises applying a RANSAC-based verification method.

15. An apparatus for recognizing an object in a scene coordinate system with a set of model features from a plurality if set of model features, comprising:
means for obtaining a set of scene features associated with the object from the scene coordinate system;
means for pruning the set of model features from a database, based on a comparison between the set scene features and the set model features to produce a pruned set of model features by applying a set of normals representing surface descriptor parameters to prune bogus model features, wherein the surface descriptor parameters comprise a location and a spin image;
means for generating a set of pose hypotheses based on a pair of scene features selected from the set of scene features;
means for applying geometric constraints to remove one or more bogus pose hypotheses for the set of pose hypotheses, thereby creating a refined set of pose hypotheses;
means for pruning said refined set of pose hypotheses based on a comparison between each pose hypotheses from the refined set of pose hypotheses and a pair of model features selected from the set of pruned model features by:
computing the probability of collision between generated hash values of the refined set of pose hypotheses and the pair of model features and retaining those pose hypotheses from the refined set of pose hypotheses and the pair of model features whose probability of collision is above a threshold probability; and
means for selecting a verified pose hypothesis from the pruned and refined set of pose hypotheses by:
transforming the set of pruned model features into the scene coordinate system, calculating a similarity score for each pose hypothesis from the pruned and refined set of pose hypotheses based on a similarity between the each pose hypothesis and the transformed set of model features; and identifying the verified pose hypothesis associated with a highest similarity score.

16. A computer implemented method for recognizing an object in a scene coordinate system with a set of model features from a plurality of sets of model features, comprising:

obtaining a set of scene features associated with the object from the scene coordinate system:

pruning the set of model features from a database, based on a comparison between the set of scene features and the set of model features to produce a pruned set of model features by applying a set of normals representing surface descriptor parameters to prune bogus model features wherein the surface descriptor parameters comprise a location and a spin image;

generating, by a computer, a set of pose hypotheses based on a pair of scene features selected from the set of scene features;

removing one or more bogus pose hypotheses from the set of pose hypotheses through the use of geometric constraints, thereby creating a refined set of pose hypotheses;

pruning said refined set of pose hypotheses based on a comparison between each pose hypotheses from the refined set of pose hypotheses and a pair of model features selected from the set of pruned model features by:

computing the probability of collision between generated hash values of each of the refined set of pose hypotheses and the pair of model features and retaining those pose hypotheses from the refined set of pose hypotheses and the pair of model features whose probability of collision is above a threshold probability; and selecting a verified pose hypothesis from the pruned and refined set of pose hypotheses.

* * * * *